UNITED STATES PATENT OFFICE.

HERMANN WAGNER, JOSEF ERBER, AND ERWIN HOFFA, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

YELLOW CHROME-MORDANT DYESTUFFS AND PROCESS OF MAKING SAME.

1,149,231. Specification of Letters Patent. Patented Aug. 10, 1915.

No Drawing. Application filed July 6, 1914. Serial No. 849,281.

*To all whom it may concern:*

Be it known that we, HERMANN WAGNER, Ph. D., JOSEF ERBER, Ph. D., and ERWIN HOFFA, Ph. D., citizens of the Empire of Germany, residing at Höchst-on-the-Main, Germany, have invented certain new and useful Improvements in Yellow Chrome-Mordant Dyestuffs and Processes of Making Same, of which the following is a specification.

We have found that by combining diazotized anthranilic acid or its substitution products with 1-phenyl-3-methyl-5-pyrazolone-sulfonic acids or a derivative thereof, valuable yellow dyestuffs are obtained which, when treated on the fiber with chromium salts, are fixed thereon in the form of color-lakes. The bodies thus obtained, which constitute sulfonic acids having the nucleus:

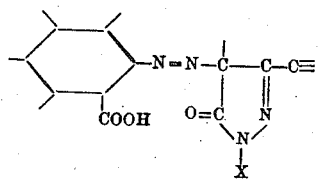

wherein X stands for an arylsulfonic acid group, are in the form of their sodium salts yellow to orange powders, readily soluble in water, very difficultly soluble in alcohol, benzene, ether and acetone, soluble in concentrated sulfuric acid with a yellowish color. The dyeings obtainable by the new dyestuffs are remarkable for their eminent fastness to carbonizing and to milling.

The following examples illustrate our invention, the parts being by weight:

Example I: 171.5 parts of 5-chloro-2-amino-benzoic acid are diazotized in the usual manner. The diazo solution thus obtained is run into a solution, rendered alkaline with sodium carbonate, of 288.5 parts of 1(2-chloro-5-sulfophenyl)-3-methyl-5-pyrazolone, and after the reaction is complete the dyestuff is precipitated with common salt, filtered and dried.

Example II: The diazo compound obtained by diazotizing 141 parts of anthranilic acid is coupled as indicated in Example I with a solution, rendered alkaline with sodium carbonate, of 254 parts of 1 (p-sulfophenyl) - 3 -methyl-5-pyrazolone. The dyestuff thus obtained is salted out, filtered and dried. It corresponds to the formula:

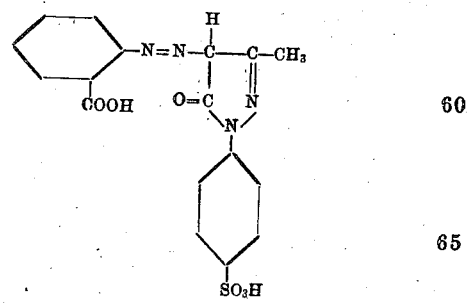

and is in the form of its sodium salt a yellow powder, readily soluble in water, difficultly soluble in alcohol, benzene, ether and acetone.

In the claims, where reference is made to "anthranilic acid", it is to be understood that the substitution products thereof are also included as equivalents in the process; and where reference is made to "1-phenyl-3-methyl-5-pyrazolonsulfonic acid," it is to be understood that the derivatives thereof are also included as equivalents in the process.

Having now described our invention what we claim is:

1. The process of manufacturing yellow chrome dyestuffs, which consists in causing the diazo compounds from anthranilic acid to act upon 1-phenyl-3-methyl-5-pyrazolonsulfonic acids.

2. As new products, the herein described sulfonic acids having the nucleus:

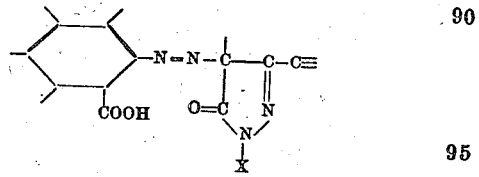

wherein X stands for an arylsulfonic group, being in the form of their sodium salts yellow to orange powders, readily soluble in water, very difficultly soluble in alcohol, benzene, ether and acetone, soluble in concentrated sulfuric acid with a yellowish color.

3. As a new product, the herein described dyestuff of the formula:
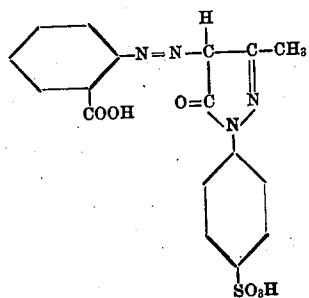
being in the form of its sodium salt a yellowish powder, readily soluble in water, difficultly soluble in alcohol, benzene, ether and acetone.
In testimony whereof, we affix our signatures in presence of two witnesses.
HERMANN WAGNER.
JOSEF ERBER.
ERWIN HOFFA.
Witnesses:
    JEAN GRUND,
    CARL GRUND.